United States Patent
McClain

(12)
(10) Patent No.: US 6,221,145 B1
(45) Date of Patent: *Apr. 24, 2001

(54) METHOD OF PRODUCING AND AQUEOUS PAINT COMPOSITION FROM A PLURALITY OF PREMIXED COMPONENTS

(75) Inventor: C. Daniel McClain, Tempe, AZ (US)

(73) Assignee: Coating Management Systems, Inc., Gilbert, AR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,332

(22) Filed: Dec. 23, 1998

(51) Int. Cl.⁷ .................................. C09C 1/36; C09D 1/00
(52) U.S. Cl. ........................ 106/443; 106/436; 106/447
(58) Field of Search ................................... 106/443, 241, 106/236, 445

(56) References Cited

U.S. PATENT DOCUMENTS

| 3,956,206 | 5/1976 | Sellars et al. | 260/17 |
|---|---|---|---|
| 4,373,930 | 2/1983 | Rothwell | 8/527 |
| 5,521,234 | 5/1996 | Brown et al. | 524/44 |
| 5,773,752 | 6/1998 | Blume et al. | 102/513 |
| 5,877,234 * | 3/1999 | Xu et al. | 523/161 |
| 5,989,331 * | 11/1999 | Bauer et al. | 106/444 |
| 6,074,474 | 6/2000 | Broome et al. | 106/486 |

FOREIGN PATENT DOCUMENTS 59-172559    9/1984    (JP) .

* cited by examiner

Primary Examiner—Mark L. Bell
Assistant Examiner—Michael J. DiVerdi
(74) Attorney, Agent, or Firm—Schmeiser, Olsen & Watts; Albert L. Schmeiser

(57) ABSTRACT

A process for producing water-based paint from a plurality of premixed compositions includes mixing at least two of a pigment composition, a dispersant thickening agent, a high resin content binder, and a low resin content binder. The pigment composition includes a pigment, water, a mixture of clay and silica, a viscosity controlling agent, and a dispersant thickener. The dispersant thickening agent includes a phosphate-based dispersant, water, a cellulosic thickener, and a coalescent.

6 Claims, No Drawings

METHOD OF PRODUCING AND AQUEOUS PAINT COMPOSITION FROM A PLURALITY OF PREMIXED COMPONENTS

BACKGROUND OF THE INVENTION

This invention relates to the production of an aqueous paint from a plurality of premixed compositions which include a pigment, a dispersant thickening agent, and low resin content and high resin content aqueous components.

The traditional manufacture of paint has utilized processes which continuously fill containers with a neutral or base color at the central facility. The containers are transported to the point of sale and stored until resale. The transport and storage in the individual containers adds significantly to the cost of the sold product for it is necessary to inventory a wide variety of paints having different finish characteristics to satisfy consumer demand. For example, the finishes offered for sale range from the traditional flat paint through varying resin compositions up to a high gloss finish. Inventory is maintained for all the different finishes at the point of sale by the merchant.

The manufacture of point at the central facility can be either a batch process or an extended continuous mixing process. The process typically calls for mixing a pigment containing ground titanium dioxide along with a thickener, a viscosity controlling agent and resin added to the water base. The pigment composition is a composition with a high percentage of solids suspended in water. Storage for any significant period of time of a premixed pigment composition typically results in settling and a non-uniform distribution of constituents throughout the premix. Consequently, manufacturing process are designed to limit the residence time in premixing containers in order to promote the manufacture of more uniform products.

The present invention is directed to the provision of premixed aqueous compositions which can be used to provide a paint mixture of varying finish characteristics at the point of sale. Thus, the merchant distributing the paint composition made from the subject premixed compositions need only maintain inventory of four compositions. The particular compositions which are the subject of the invention exhibit stable characteristics during storage in their respective reservoirs.

SUMMARY OF THE INVENTION

This process utilizes a plurality of aqueous compositions to provide the opportunity to mix the full range of finishes at the point of sale. The compositions include a pigment composition, a dispersant-thickening agent, a high resin content binder and a low resin content binder. From these four compositions, the process enables the seller to use from two to four of the premixed compositions to create flat, satin, low sheen, semi-gloss up to high gloss finishes. The pigment composition is common to all combinations and is characterized by the use of a combination dispersant-thickener, a mixture of clay and silica and a viscosity controlling agent along with water and finely-divided titanium dioxide.

The pigment composition contains the titanium dioxide in the range of 40 to 50 percent by weight and the water is about 25 percent by weight of the composition. The clay-silica mixture is about 15 percent and serves to maintain the suspension. The viscosity controlling agent is added at about 10 percent. The combination of dispersant and thickener is added at less than 5 percent and enables the premixed pigment composition to maintain a uniform distribution of the solid throughout its volume.

The second component is an aqueous composition used primarily as a dilutant and contains a dispersant, a thickener and a coalescent. The second component is combined with the pigment composition for all desired finishes with the exception of a high gloss finish. The high resin component is predominantly resin at about 80 percent. The low resin component contains more water with the resin in the 45 to 50 percent range. Between one and three components are combined with the pigment composition to provide the various finishes at the point of sale.

DETAILED DESCRIPTION OF THE INVENTION

The present invention is directed to the provision of four premixed aqueous compositions that are sufficiently stable to be utilized at the point of sale to the user to generate a water-based paint composition having the desired finish characteristics. The process of mixing these compositions to develop paints ranging from a flat finish to a high gloss finish relies primarily on the pigment-containing premixed constituent since it is the one constituent that contains a high percentage of solids and is common to all paint compositions made in accordance with the present process.

The pigment-containing constituent central to the present process contains titanium dioxide finely ground in an amount residing within the range of 40 to 50 percent by weight of the premix dispersion. The ground titanium dioxide is a commercially available product used in a wide variety of paint compositions and its preparation techniques are well-known in the industry. The titanium dioxide is added to water which comprises about 25 percent of the resultant dispersion. During the blending process, a mixture of calcined clay and silica in an amount of 15 percent by weight is added to maintain the titanium dioxide in suspension. A viscosity controlling agent is also added in an amount of about 10 percent of the resultant premix dispersion.

In order to maintain the titanium dioxide in a uniform dispersion, a dispersant-thickener is added during blending in an amount of less than 5 percent of the dispersion. It has been found that the combination of a commercially-available dispersant supplemented by the addition of a phosphate-based dispersant such as potassium tri poly phosphate (KTPP) along with a modest amount of thickener enables the titanium dioxide pigment dispersion to remain uniform in distribution while stored.

The commercially available dispersant sold as BUS-PERSE and manufactured by Buckman Chemicals is the primary dispersant and is added in amount of about 3.6 weight percent. In addition, the phosphate based dispersant KTPP is added in amount of about 0.2 weight percent to the dispersion. It is believed that the phosphate ions in this additive replace the carbonate and other ions in the water to enhance the wetting properties of the water and thereby promote the distribution of the titanium dioxide throughout. The thickener added is a cellulosic thickening agent. Several are commercially available for use in the manufacture of aqueous paint compositions. One example is the thickener sold under the trademark 481 by AKZO NOBEL (Sweden).

The novel combination of these additives to the combination of titanium dioxide and water in the stated proportions has been found to enable the aqueous pigment dispersion to be used at point of sale to generate the wide scope of paint products. In tests of the pigment dispersion stored in a 55 gallon reservoir without agitation for a period of 2 ½ months, no discernible settling was noted. The addition of resin in an amount of about 5 percent of the dispersion has been found to aid in reducing the time for the resultant paint to cure. This factor is useful but tends to reduce the storage time of the pigment dispersion and is utilized only when a reduced curing time is important to the user.

At the point of sale, three additional premixed aqueous compositions are available to custom prepare the desired paint. Not all are utilized for each paint product. The second composition in terms of likely usage is a dispersant-thickening agent which serves as a dilutant. The second composition is predominantly water in an amount of about 93 percent by weight. There are three additional additives to the second composition. They include a phosphate-based dispersant such as the potassium tri poly phosphate used in the pigment composition in an amount of less than 1 percent. The phosphate-based dispersant is added along with approximately a like amount of a cellulosic thickener. The combination of dispersant and thickener acts in the same manner as with the pigment composition although it is to be noted that the amount of thickener is several times that used in the pigment composition. The additional additive is a coalescent in an amount of 4 to 5 weight percent. One commercial coalescent found suitable for use is sold under the trademark TEXANOL by Texaco.

The pigment composition and dispersant-thickener agent are intermixed when formulating all paint compositions with the exception of a high gloss finish paint composition. The third and fourth compositions available for mixing are the resin-containing compositions. The low resin composition is about 50 percent by weight and about 28 percent water. To this mixture of resin and water is added diatomaceous earth as a flattening agent in the amount of 7 percent and a combination of ground limestone and calcined clay at 11 percent and 3.5 percent respectively. The combination of a dispersant and thickener are added in the aggregate amount of about 1.2 percent to promote the same long shelf life characteristic evidenced by the pigment composition.

The high resin component contains resin in an amount of about 80 percent, water at about 15 percent and a commercially-available coalescent at about 2 percent. The amount of resin and water in the low and high resin compositions can be varied to achieve different finish characteristics. The resin utilized in the paint products formulated from the different combinations and found to provide the desired results is 6183 made by BASF. However, it is to be noted that other commercially available resins can be used if desired.

The four above-discussed formulations have been determined to be stable and free from settling when stored in reservoirs for extended periods. To produce a desired paint product, each storage reservoir is coupled through fluid pumps and appropriate valving to dispensing outlets with the discharge therefrom being directed into the point of sale container. The pigment composition is common to all products produced as stated previously. A flat finish product utilizes the pigment composition, the dispersant thickening agent and the low resin component. To produce the paint products referred to as eggshell, satin and low sheen finishes a portion of high resin component is concurrently added to the flat finish mixture. In the case of a desired semi-gloss finish paint, the high resin component is used as a replacement for the low resin component. A full gloss paint utilizes only the pigment composition and the high resin component. The actual balances between the components for the different finishes can be varied in accordance with the needs of the purchaser for a particular type of finish.

Typical compositions suitable for programmed dispensing at the point of sale include the constituents in the weight percentages shown below:

| Finish | Pigment Composition | Disp-Thickening | Low Resin | High Resin |
|---|---|---|---|---|
| Flat | 33.6 | 51.7 | 14.7 | 0 |
| Satin | 32.4 | 35.6 | 9.8 | 22.2 |
| Semi Gloss | 32.1 | 36.2 | 0 | 31.7 |
| High Gloss | 33.0 | 0 | 0 | 67.0 |

While the above description has referred to the invention in terms of specific formulations, it is to be noted that variations and modifications may be made therein without departing from the scope of the invention as claimed.

What is claimed is:

1. An aqueous coating composition which includes the combination of a finely-divided pigment composition and a dispersant thickening agent wherein said pigment composition comprises:
    a) a pigment including titanium dioxide in the range of 40 to 50 percent;
    b) water of about 25 percent;
    c) a mixture of clay and silica of about 15 percent;
    d) a viscosity controlling agent of about 10 percent; and
    e) a dispersant-thickener combination of less than 5 percent, said percentages being based on weight of the dispersion, and a dispersant thickening agent comprising:
        1) water in an amount of about 93 percent;
        2) a phosphate-based dispersant in an amount of less than 1 percent;
        3) a cellulosic thickener in an amount of about 1 percent; and
        4) a coalescent in an amount of 4 to 5 percent.

2. The coating composition of claim 1 wherein the dispersant-thickener of said pigment composition includes a phosphate-based dispersant.

3. The coating composition of claim 2 wherein the phosphate-based dispersant is potassium tri poly phosphate.

4. The process of producing an aqueous paint from a plurality of premixed aqueous compositions, said compositions comprising a pigment composition and compositions selected from the group consisting of a dispersant-thickening agent, a high resin content binder, a low resin content binder, and mixtures thereof, said process simultaneously or sequentially mixing the pigment composition with at least one of the other compositions wherein the pigment composition includes titanium dioxide in the range of 40 to 50 percent, water of about 25 percent, a mixture of clay and silica of about 15 percent, a viscosity controlling agent of about 10 percent, and a combination of dispersant and thickener in an amount of less than 5 percent, said percentages being based on weight of the pigment composition.

5. The process of claim 4 wherein said combination of dispersant and thickener in said pigment composition includes a phosphate-based dispersant.

6. The process of claim 5 wherein said phosphate-based dispersant is potassium tri poly phosphate.

* * * * *